United States Patent [19]

Kemp

[11] Patent Number: 5,001,101
[45] Date of Patent: Mar. 19, 1991

[54] SULFIDING OF HYDROGEL DERIVED CATALYSTS

[75] Inventor: Richard A. Kemp, Stafford, Tex.

[73] Assignee: Shell Oil Company, Houston, Tex.

[21] Appl. No.: 187,189

[22] Filed: Apr. 28, 1988

[51] Int. Cl.$^5$ ............................................. B01J 27/19
[52] U.S. Cl. .................................. 502/211; 502/210; 502/220; 502/221; 208/216 R; 208/217
[58] Field of Search ............... 502/210, 211, 220, 221; 208/216 R, 217

[56] References Cited

U.S. PATENT DOCUMENTS

| | | | |
|---|---|---|---|
| 2,946,738 | 7/1960 | Gardner et al. | 208/215 |
| 3,223,652 | 12/1965 | Erickson et al. | 252/439 |
| 3,324,045 | 6/1967 | Mason | 252/439 |
| 3,325,396 | 6/1967 | Lindquist | 208/111 |
| 3,519,556 | 7/1970 | Schutt | 208/111 |
| 3,761,397 | 9/1973 | Gatti | 208/215 |
| 4,177,136 | 12/1979 | Herrington et al. | 208/215 |
| 4,710,486 | 12/1987 | Lopez et al. | 502/220 |
| 4,716,140 | 12/1987 | Kemp | 502/211 |
| 4,716,141 | 12/1987 | Kemp | 502/211 |
| 4,717,698 | 1/1988 | Kemp | 502/211 |
| 4,717,704 | 1/1988 | Kemp | 502/211 |
| 4,717,705 | 1/1988 | Kemp | 502/211 |
| 4,717,706 | 1/1988 | Kemp | 502/211 |
| 4,738,945 | 4/1988 | Kemp | 502/211 |

Primary Examiner—Patrick P. Garvin
Assistant Examiner—E. D. Irzinski
Attorney, Agent, or Firm—Pamela J. McCollough

[57] ABSTRACT

The present invention relates to a process for increasing the desulfurization activity of a catalyst prepared by incorporating an element selected from the group consisting of nickel, cobalt and mixtures thereof, and a heavy metal selected from the group consisting of molybdenum, tungsten and mixtures thereof, into an alumina hydrogel, wherein said catalyst is sulfided with the gaseous sulfur compound at a temperature of at least about 900° F. for at least one hour.

18 Claims, No Drawings

5,001,101

SULFIDING OF HYDROGEL DERIVED CATALYSTS

FIELD OF THE INVENTION

This invention relates to an improved sulfiding treatment for hydrogel derived hydrotreating catalysts which results in superior catalyst performance.

BACKGROUND OF THE INVENTION

In the hydrogenation of hydrocarbon fractions, catalysts are used which comprise a hydrogenation component usually on a suitable support such as, for example, silica, alumina, or mixtures thereof. The hydrogenation component is customarily supplied by a transition metal or metals, such as metals from Group VIB, Group VIII and some Group IB metals. Particularly suitable metals include copper, nickel, tungsten, cobalt, and molybdenum. The catalysts are conventionally prepared by impregnation of the support with the solution or dispersion of a decomposable salt of the metal hydrogenation component, followed by calcination in air to convert the salt to metal oxide. The hydrogenation component can be employed as the metal, metal oxide, metal sulfide, or mixtures thereof.

It is frequently desirable to convert the metal to a sulfide when the catalyst is used to process a sulfur-containing feed.

In general, the art teaches that sulfiding or conversion of the metal hydrogenation component to its sulfide form, can be accomplished by contacting the catalyst with hydrogen sulfide or organic sulfur compounds mixed with hydrocarbons at elevated temperatures up to about 1200° F. However, loss in catalyst activity can result if sulfiding is carried out at a high temperature. Consequently, it is customary to employ relatively low temperatures, i.e., in the range of 750° F. or lower, to avoid sintering of the metal components and in order to meet metallurgical limitations of the process equipment. For catalysts which have metals such as nickel incorporated by impregnation, U.S. Pat. No. 3,325,396 and U.S. Pat. No. 3,324,045 teach that sulfiding temperatures should not exceed 750° F.

U.S. Pat. No. 3,519,556 discloses an activation treatment for hydroconversion catalysts to increase hydrocracking activity which comprises sequentially calcining and sulfiding a metal and fluoride-containing hydrogel catalyst at temperatures of at least 930° F. Fluoride-containing catalysts, however, have the drawback that fluoride leaches from the catalyst during use and forms hydrogen fluoride, which is extremely corrosive.

SUMMARY OF THE INVENTION

The present invention relates to a process for increasing the desulfurization activity of a catalyst prepared by incorporating an element selected from the group consisting of nickel, cobalt and mixtures thereof, and heavy metal selected from the group consisting of molybdenum, tungsten and mixtures thereof, into an alumina hydrogel, wherein said catalyst is sulfided with a gaseous sulfur compound at a temperature of at least about 900° F. for at least one hour.

It has been found that hydrogel-derived catalysts, when subjected to a high temperature sulfiding procedure, show enhanced desulfurization activities of at least about 10% relative to conventionally sulfided catalysts, while impregnated catalysts do not show such a benefit. Catalysts prepared by a hydrogel route are advantageous from the stand point of higher metals utilization and lower cost of catalyst manufacture when compared to conventionally prepared catalysts. The hydrogel derived catalysts in the instant invention have high surface areas, at least about 300 $m^2/g$, and at least about 75% of their pore volume in pores having diameters less than about 70 Å. These catalysts are particularly useful for hydrotreating applications in which high hydrodesulfurization activities are desired.

DESCRIPTION OF THE PREFERRED EMBODIMENTS

In the process of the instant invention, the hydrotreating catalyst having improved desulfurization activity is prepared by sulfiding a catalyst prepared by incorporating an element selected from the group consisting of nickel, cobalt and mixtures thereof, a heavy metal selected from the group consisting of molybdenum, tungsten and mixtures thereof and, optionally a phosphorus-containing compound into an alumina hydrogel at temperatures of at least about 900° F. for at least one hour. The catalysts of this invention are prepared by incorporating an element selected from the group consisting of nickel, cobalt and mixtures thereof, a heavy metal selected from the group consisting of molybdenum, tungsten and mixtures thereof, and optionally, a phosphorus-containing compound into an alumina hydrogel prepared by titrating an aqueous solution of an acidic aluminum species and an aqueous solution of a basic aluminum species, optionally in the presence of a phosphorus-containing compound, and subsequently calcining the hydrogel to prepare the catalyst.

The catalysts used in this invention are prepared by the preparative techniques disclosed in commonly-assigned, copending application Ser. No. 067,039, filed June 29, 1987, U.S. Pat. No. 4,717,698, U.S. Pat. No. 4,716,140, U.S. Pat. No. 4,716,141, U.S. Pat. No. 4,717,704, U.S. Pat. No. 4,717,705 and U.S. Pat. No. 4,717,706, the teachings of which are incorporated herein by reference.

The alumina hydrogel can be prepared by titrating an aqueous solution of one or more aluminum salt(s) with an appropriate acidic or basic material or solution, optionally in the presence of a phosphorus-containing compound, to cause precipitation of the alumina gel. One skilled in the art will recognize that the alumina gel can be prepared by titrating an acidic aluminum salt such as, for example, aluminum sulfate, aluminum nitrate or aluminum chloride, in aqueous solution with a basic precipitating medium such as, for example, sodium hydroxide or ammonium hydroxide, optionally in the presence of a phosphorus-containing compound, or, by titrating an alkali metal aluminate such as, for example, sodium aluminate or potassium aluminate, in aqueous solution with an acidic precipitating medium such as, for example, hydrochloric acid or nitric acid, optionally in the presence of a phosphorus-containing compound. One skilled in the art will recognize that the adjustment of the pH of an aluminum-containing solution to between about 5.5 and about 10.0 will result in precipitation of the aluminum as aluminum hydroxide or hydrated aluminum oxide.

As used herein, the term "a phosphorus-containing compound" is generic and refers to one phosphorus-containing compound as well as to more than one phosphorus-containing compound. Suitable phosphorus-containing compounds are the acids of phosphorus and their salts. Typical acids of phosphorus include phosphonic acids, phosphinic acids, phosphorous acids and the like. The phosphorus-containing compound is generally selected from the group consisting of phosphoric acid, a phosphate salt and mixtures thereof. Suitable phosphate salts include alkali metal phosphates, alkali metal hydrogen phosphates, ammonium phosphate and ammonium hydrogen phosphate. The phosphorus-containing compound is preferably phosphoric acid and is preferably mixed with the acid aluminum species prior to the precipitation. Alternatively, the phosphorus-containing compound can be sodium or ammonium phosphate and mixed with the basic aluminum species prior to precipitation. The phosphorus-containing compound can also be added as a separate solution or added to both the acid aluminum species and the basic aluminum species without significantly affecting the results. Preferably, the phosphorus-containing compound is prepared using commercially available 85% phosphoric acid although other phosphorus-containing materials may be utilized. The amount of phosphorus-containing compound added to the acid aluminum species and/or the basic aluminum species is from about 0.06 to about 0.30 moles of phosphorus per mole of aluminum.

In one embodiment, the alumina hydrogel is prepared by titrating an aqueous solution of an alkali metal aluminate and an aqueous solution of an acid aluminum salt to cause precipitation of the alumina gel. Suitable acidic aluminum salts include aluminum sulfate, aluminum nitrate and aluminum chloride. A preferred species is aluminum chloride. Suitable alkali metal aluminates are sodium aluminate and potassium aluminate. The precipitation can be carried out by adding an aqueous solution of the basic aluminum species to an aqueous solution of the acidic aluminum species or the procedure can be reversed by adding an aqueous solution of the acidic aluminum species to an aqueous solution of the basic aluminum species (referred to as "sequential precipitation"). Preferably, the precipitation in the instant invention is carried out by simultaneously adding the acid aluminum species and the basic aluminum species to cause precipitation of the hydrogel (referred to as "simultaneous precipitation"). The maximum rate of addition of the acid aluminum species and the basic aluminum species is fixed by the rate at which the two streams can be mixed and the pH and temperature of the system can be effectively controlled.

In an alternative embodiment, the alumina hydrogel is prepared by titrating an aqueous solution of an alkali metal aluminate and an aqueous solution of an acid aluminum salt, at least one of which has a phosphorus-containing compound dissolved therein, to cause precipitation of the phosphated alumina gel.

The ranges and limitations provided in the instant specification and claims are those which are believed to particularly point out and distinctly claim the instant invention. It is, however, understood that other ranges and limitations that perform substantially the same function in substantially the same manner to obtain the same result are intended to be within the scope of the instant invention as defined by the instant specification and claims.

The temperature and pH of the precipitation are important variables in the preparation of the aluminas into which metals can be incorporated to form catalysts with desirable physical qualities. One skilled in the art would recognize that changes in precipitation temperatures and pHs result in changes in porosities. The optimal temperatures and pHs for the precipitation of the aluminas can be determined with a minimal amount of routine experimentation. In the instant invention, a precipitation temperature typically ranges from about 20° C. to about 90° C., preferably from about 50° C. to about 85° C., more preferably from about 55° C. to about 65° C., and a precipitation pH typically ranges between about 5.5 and about 10.0, preferably between about 5.5 and about 8.0, and more preferably between about 6.0 and about 7.5. The length of time required for the precipitation step is typically from about 15 minutes to about 45 minutes. The period of time for the precipitation should be sufficiently long for adequate mixing of the materials, but not long enough for enhanced particle growth to occur.

After the precipitation step is completed, the pH of the slurry is adjusted by the addition of the basic aluminate solution to fall in the range from about 8.0 to about 12.0, preferably about 9.0 to about 11.0, most preferably about 9.5 to about 10.5, and aged at a temperature in the range from about 20° C. to about 90° C., preferably about 50° C. to about 85° C. for at least 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature.

After aging, the slurry is washed and filtered in routine fashion to remove substantially all of the water-soluble salts formed during the precipitation of the hydrogel. The preferred solvent for washing is water although other solvents such as lower alkanols may be utilized.

After washing, the metals are incorporated into the hydrogel. One method for adding the metals to the hydrogel is a reslurry step in which the hydrogel is reslurried with a metals solution containing solubilized salts of an element selected from the group consisting of nickel, cobalt, and mixtures thereof, and an element selected from the group consisting of molybdenum, tungsten, and mixtures thereof, sufficient to deposit on the final catalyst from about 1% w to about 5% w nickel and/or cobalt, and from about 8% w to about 18% w molybdenum or about 10% w to about 32% w tungsten. When mixtures of molybdenum and tungsten are utilized, the final catalyst contains from about 8% w to about 32% w molybdenum and/or tungsten. The solution may, however, contain amounts of nickel and/or cobalt and molybdenum and/or tungsten in excess of that required to deposit the aforesaid amounts of metals, which excess may be removed by washing or other techniques following the reslurry step. A typical metals solution can be prepared by combining a molybdenum and/or tungsten solution with a nickel and/or cobalt solution. In a preferred embodiment, the metals solution contains a stabilizing amount of a phosphorus-containing compound. Typically, the metals solution contains a phosphorus-containing compound in an amount of from about 0.2 to about 1.5 moles of phosphorus per mole of molybdenum or tungsten. Suitable phosphorus-containing compounds include the acids of phosphorus and their salts. Typical acids of phosphorus include phosphoric acids, phosphonic acids, phosphinic acids, phosphorous acids and the like. The phosphorus-containing compound is generally selected from the group consisting of phosphoric acid, a phosphate salt and mixtures thereof. Suitable phosphate salts include alkali metal phosphates, alkali metal hydrogen phosphates, ammonium phosphate and ammonium hydrogen phosphate.

The molybdenum solution consists of a water-soluble source of molybdenum oxide such as ammonium heptamolybdate or ammonium dimolybdate dissolved in water and optionally, a phosphorus-containing compound. Hydrogen peroxide may also be used to aid in solution preparation in some cases. A preferred method for preparing the molybdenum solution consists of adding hydrogen peroxide to the solution in the range of about 0.1 to about 1.0 mole of hydrogen peroxide per mole of molybdenum. Optionally, a suitable soluble amine compound such as monoethanolamine, propanolamine, or ethylenediamine may be added to the molybdenum solution in order to aid in stabilization of the solution.

The tungsten solution typically consists of ammonium metatungstate dissolved in water and optionally, a phosphorus-containing compound. A preferred method for preparing the tungsten solution consists of adding hydrogen peroxide to the solution in the range of about 0.1 to about 1.0 mole of hydrogen peroxide per mole of tungsten. In addition, a suitable soluble amine compound such as monoethanolamine, propanolamine, or ethylenediamine may be added to the tungsten solution in order to aid in stabilization of the solution.

The nickel solution consists of nickel salts dissolved in water and optionally, a phosphorus-containing compound. A wide range of nickel compounds are suitable, such as nickel nitrate, nickel aceteate, nickel formate, nickel sulfate, nickel oxide, nickel phosphate, nickel carbonate, nickel chloride and nickel hydroxide. Two compounds which are especially useful include nickel nitrate and nickel carbonate.

The cobalt solution consists of cobalt salts dissolved in water and optionally, a phosphorus-containing compound. A wide range of cobalt compounds is suitable, such as cobalt nitrate, cobalt hydroxide, cobalt acetate, cobalt oxalate, or cobalt oxide. The preferred cobalt compound is cobalt nitrate.

An alternative method for incorporating the metals into the hydrogel is to add dry, water-soluble metal salts of an element selected from the group consisting of nickel, cobalt and mixtures thereof, and dry, water-soluble salts of a heavy metal selected from the group consisting of molybdenum, tungsten and mixtures thereof, to the hydrogel and mix until dissolution and adsorption of the metal salts onto the gel is substantially complete. The metal salts of nickel and/or cobalt and molybdenum and/or tungsten are added to the hydrogel in amounts sufficient to incorporate into the final catalyst from about 1% w to about 5% w nickel and/or cobalt and from about 8% w to about 18% w molybdenum or about 10% w to about 32% w tungsten. When mixtures of molybdenum and tungsten are utilized, the final catalyst contains about 8% w to about 32% w molybdenum and/or tungsten.

Molybdenum is generally added to the hydrogel as a dry, water-soluble source of molybdenum such as ammonium heptamolybdate or ammonium dimolybdate. Tungsten is typically added to the hydrogel as ammonium metatungstate. Nickel is preferably added to the hydrogel in the form of dry water-soluble nickel nitrate, nickel acetate, nickel formate, nickel sulfate, nickel oxide, nickel phosphate, nickel carbonate, nickel chloride or nickel hydroxide, with nickel nitrate and nickel carbonate being preferred. Cobalt is added to the hydrogel in the form of dry, water-soluble cobalt nitrate, cobalt hydroxide, cobalt acetate, cobalt oxalate or cobalt oxide, with cobalt nitrate being preferred. In a preferred embodiment, a phosphorus-containing compound in an amount of phosphorus in the range from about 0.2 to about 1.5 moles of phosphorus per mole of molybdenum or tungsten is added directly to the hydrogel. The phosphorus-containing compound is typically added, either wet or dry, to the hydrogel in an amount ranging from about 0.2 to about 1.5 moles of phosphorus per mole of molybdenum or tungsten. The phosphorus-containing compound is preferably added directly to the hydrogel as phosphoric acid, a phosphate salt or mixtures thereof. Alternatively, the phosphorus-containing compound can be mixed with the dry nickel salt or the dry cobalt salt, or with the dry molybdenum or tungsten salt prior to addition to the hydrogel.

A preferred method of mixing the dry metal salts of nickel and/or cobalt molybdenum and/or tungsten with the hydrogel consists of adding hydrogen peroxide to the mixture of dry metal salts and hydrogel in an amount ranging from about 0.1 to about 1.0 mole of hydrogen peroxide per mole of molybdenum and/or tungsten. Optionally, a suitable amine compound such a monoethanolamine, propanolamine, or ethylenediamine may be added to the mixture of dry metal salts and hydrogel in order to aid in stabilization of the mixture of the metal salts and the hydrogel.

The dry metals salts of nickel and/or cobalt, molybdenum and/or tungsten, and optionally, the phosphorus-containing compound (if added dry) are typically added to the hydrogel in the form of finely divided particles which are generally 100 mesh or less in size. While particle size is not critical and larger particle sizes may be utilized, it is economically advantageous to use particles which are 100 mesh or less in size.

It is also within the scope of this invention to combine the two methods described above for adding the metals to the hydrogel. For example, one metal may be added to the hydrogel as a dry salt and another added in the form of a solution. Various permutations of this combination of dry salts additions and metals solutions additions would be obvious to one skilled in the art.

The temperature and pH of the step in which the metals solutions and/or the dry metal salts are mixed with the hydrogel are important variables in the preparation of hydrogel-derived catalysts which have acceptable densities and porosities. The temperature of the mixing step affects the catalysts only when the metals solution contains phosphorus or when phosphorus is added along with the dry metal salts with the trend being for higher temperatures to yield lower density catalysts. The pH of the mixing step, however, is critical to the formation of catalysts having the desired properties. The mixing of the hydrogel support with the metals solution or the dry metal salts is carried out at a pH in the range between about 4.0 and about 10.0, preferably between about 4.0 and about 8.0, and a temperature in the range between about 25° C. and about 100° C., preferably between about 25° C. and about 80° C., until incorporation of the metals salts into the gel is sufficient to yield a final calcined catalyst having from about 1% w to about 5% w nickel and/or cobalt and from 8% w to about 32% w heavy metal selected from the group consisting of molybdenum, tungsten and mixtures thereof. Typically, the times for mixing the hydrogel and the metals will range from about 0.5 to about 2 hours. Optionally, the resulting material can be washed to remove unadsorbed metals and filtered in routine fashion.

Following the addition of the metals to the hydrogel, the resulting material is processed in one of many routine methods to produce a finished catalyst. The material may be extruded and then dried and calcined., dried, mulled with addition of water, extruded or pelletized and calcined, or partially dried, extruded or pelleted, dried more completely and calcined. Drying is accomplished by conventional means. It may be carried out by forced draft drying, vacuum drying, air drying or similar means. Drying temperatures are not critical and depend upon the particular means utilized for drying. Drying temperatures will typically range from about 50° C. to about 150° C.

In a preferred embodiment, the material is extruded and then dried. Alternatively, the material may be extruded after drying to the proper loss on ignition (LOI). However, to facilitate extrusion, organic binders and/or lubricants may be added prior to extrusion.

After drying, the material is calcined to produce the finished catalyst. The material may be calcined in an oxidizing or neutral atmosphere, although air is preferred. However, if binders and/or lubricants are used the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatures will range from about 300° C. to about 900° C. Drying, calcining and burn-out may be combined in one or two steps. Most frequently the calcining and/or burn-out steps are combined using an oxygen-containing atmosphere.

Following calcination, the catalyst is subjected to a conventional sulfiding procedure followed by a special activation treatment consisting of contacting the catalyst with a sulfur compound containing gas at a temperature of at least about 900° F. for at least about one hour. While the sulfiding treatment can be carried out immediately following calcination of the catalyst, it is not necessary in order to achieve the benefits of this invention. The sulfiding treatment can be carried out in various ways as will be evident to one of ordinary skill in the art. A conventional sulfiding procedure is typically accomplished by contacting the catalyst with a gaseous sulfiding agent at temperatures below about 750° F. The temperature can be either be raised rapidly and held constant at a temperature below about 750° F., or raised gradually to a temperature below about 750° F. In general, the sulfiding procedure is carried out by subjecting the catalyst to a 5% $H_2S/H_2$ gas mixture for two hours at a temperature in the range of from about 350° F. to about 450° F., raising the temperature to between about 550° F. and about 650° F. for one hour, and then raising the temperature to between about 650° F. and about 750° F. for an additional two hours. Following this conventional sulfiding treatment, the catalyst is subjected to a special activation treatment or high temperature sulfiding procedure in accordance with the invention by contacting the catalyst with a gaseous sulfiding agent for at least one hour at a temperature of at least about 900° F. This high temperature sulfiding procedure results in hydrogel-derived catalysts which have desulfurization activitites about 10% higher than conventionally sulfided hydrogel-derived catalysts, while impregnated catalysts subjected to a high temperature sulfiding procedure do not show an increase in desulfurization activity relative to conventionally sulfided impregnated catalysts.

Any sulfur compound which decomposes in the presence of hydrogen and the catalyst, allowing the sulfur to be reacted with the catalyst, is suitable for the sulfiding treatment. Hydrogen sulfide is usually available, inexpensive, and particularly suitable. Carbon disulfide and lower boiling mercaptans are further examples of suitable sulfur compounds. While the concentration of the sulfiding gas is not critical, it is desirable to maintain the sulfur concentration (calculated as $H_2S$) below about 20% volume. It is especially preferred to use about 5% volume $H_2S$ in hydrogen as the sulfiding gas. The purity of the gas stream is not critical as long as substantial amounts of hydrocarbons which produce coke or carbon on the catalyst are not present. Process recycle or plant hydrogen streams often available in a refinery are suitable.

The sulfiding treatment of the invention can be carried out at any desired pressure. It is often convenient, however, to conduct the sulfiding at elevated pressure to allow recycle of the sulfiding gas with the existing plant gas compressors and to achieve a relatively high mass flow rate for good distribution and contact with the catalyst. A pressure in the range of about 15 psig to about 2000 psig is very suitable.

The final catalysts are found to have surface areas greater than about 300 $m^2/g$, pore volumes ranging from about 0.5 to about 1.2 cc/g and with at least about 75% of its pore volume in pores having diameters less than about 70 Å. In general, the metals contents of the final catalysts range from about 1% w to about 5% w nickel and/or cobalt, preferably from about 2.5% w to about 4% w nickel and/or cobalt, and from about 8% w to about 18% w, preferably from about 10% w to about 14% w molybdenum or about 10% w to about 32% w, preferably from about 18% w to about 26% w tungsten.

Catalysts prepared according to the method of the present invention have been found to be particularly useful for the removal of non-hydrocarbon impurities such as sulfur from a wide range of petroleum hydrocarbon stocks. The hydrocarbon stocks include mineral oil base stock for lubricants, lighter petroleum distillates such as gas oil for catalytic cracking and hydrocracking, wax distillates from paraffin crudes, catalytically cracked distillates, coal tar distillates and the like. The processing conditions for the desulfurization, denitrification and dehydrogenation will vary with the feedstock desired. Generally the temperatures will be in the range of about 400° to about 850° F., preferably in the range of about 500° F. to about 750° F., pressures may range from atmospheric or higher to about 5000 psig, preferably in the range from about 400 psig to about 2500 psig. The weight hourly space velocity (weight feed per weight of catalyst per hour, WHSV) can be in the range of about 0.1 to about 20, preferably from about 0.1 to about 10 WHSV. Suitable free hydrogen ratios are from about 100 to about 10,000 standard cubic feed per barrel (s.c.f. per b.) of feed.

Multiple uses of these feedstock after treating with the catalysts of this invention are possible. Depending on the particular feedstocks treated, suitable uses can include conversion unit feedstock such as thermal cracking and hydrocracking, or finish products such as gasoline, diesel, airline turbine fuel, furnace oils, solvents, fuel oils and asphalts.

The process of the instant invention will be further describe below buy the following examples which are provided for illustration in which are not to be construed as limiting the invention.

EXAMPLE 1

Seven hundred and forty grams of reagent grade sodium aluminate were added to 1000 grams of water which was then heated to 60° C. in order to effect dissolution of the materials. Five hundred and forty-four grams of aluminum chloride hexahydrate were added to 760 grams of water. One hundred and twelve grams of 85% phosphoric acid along with 112 grams of water were added to the aluminum chloride solution which was then heated to 60° C. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 762 grams of aluminum chloride solution were used to effect the titration. After these quantities of reagents had been used, the final aging pH of the solution rose to between 11.0 and 12.0. The solution was aged for one hour at 60° C. The resulting material was filtered and washed in two large Buchner funnels with about 50 liters of water. The excess water from the wet filter cake was removed by vacuum. The hydrogel was then divided into four equal portions.

The following solutions were then prepared. 91.71 Grams of nickel nitrate as hexahydrate was mixed with 64.6 grams of 85% phosphoric acid and diluted to 1500 milliliters with water. An additional solution of 136.2 grams of ammonium heptamolybdate 21.2 grams of 30% hydrogen peroxide, and 12 grams of monoethanolamine were diluted to 1500 milliliters with water. The two solutions were combined slowly with stirring and one portion of the hydrogel was added and reslurried with one-fourth of the solution at 80° C. for two hours at a pH of 5.5. At the end of two hours, the slurry was filtered and washed with two liters of water. The excess water from the slurry was again removed by vacuum. The wet gel was then extruded using a small, hand-held extruder using a 0.156" cylindrical die, dried overnight at 120° C. and calcined in air at 510° C. The properties of the catalyst are listed in Table 1.

EXAMPLE 2

Five hundred and eighty-three grams of reagent grade sodium aluminate were added to 787 grams of water which was then heated to 60° C. in order to effect dissolution of the materials. Two hundred and seventy-one grams of aluminum chloride hexahydrate were added to 379 grams of water. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. All of the reagents were used. After the reagents had been added, the final aging pH of the solution was adjusted to 10.0 using hydrochloric acid. The solution was aged for one hour at 60° C. The resulting material was filtered and washed in two large Buchner funnels with about 50 liters of water. The excess water from the wet filter cake was removed by vacuum. The hydrogel was then divided into two equal portions.

A mixture of 29.64 grams of cobalt nitrate as hexahydrate and 29.9 grams of 85% phosphoric acid was then prepared. This mixture, along with 47.97 grams of ammonium heptamolybdate, 14.18 grams of 30% hydrogen peroxide, and 8.0 grams of MEA were directly added to one portion of the hydrogel at 80° C. at a pH of 5.5. The resulting mixture was then stirred for two hours. At the end of two hours, the slurry was filtered and the excess water from the slurry was removed by vacuum. The wet gel was then extruded using a small, hand-held extruder using a 0.156" cylindrical die, dried overnight at 120° C. and calcined in air at 510° C. The properties of the catalyst are listed in Table I.

EXAMPLE 3

Seven hundred and forty grams of reagent grade sodium aluminate were added to 1000 grams of water which was then heated to 60° C. in order to effect dissolution of the materials. Five hundred and forty-four grams of aluminum chloride hexahydrate were added to 760 grams of water. One hundred and twelve grams of 85% phosphoric acid along with 112 grams of water were added to the aluminum chloride solution which was then heated to 60° C. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 761 grams of aluminum chloride solution were used to effect the titration. After these quantities of reagents had been used, the final aging pH of the solution rose to between 10.5 and 11.5. The solution was aged for one hour at 60° C. The resulting material was filtered and washed in two large Buchner funnels with about 50 liters of water. The excess water from the wet filter cake was removed by vacuum. The hydrogel was then divided into three equal portions.

The following solutions were then prepared. 39.8 Grams of cobalt nitrate as hexahydrate was mixed with 25.0 grams of 85% phosphoric acid and diluted to 1000 milliliters with water. An additional solution of 60.6 grams of ammonium heptamolybdate, 23.8 grams of 30% hydrogen peroxide, and 13.5 grams of monoethanolamine were diluted to 1000 milliliters with water. The two solutions were combined slowly with stirring and one portion of the hydrogel was added and reslurried with one third of the solution at 25° C. for two hours at a pH of 5.5. At the end of two hours, the slurry was filtered and washed with two liters of water. The excess water from the slurry was again removed by vacuum. The wet gel was then extruded using a small, hand-held extruder using a 0.156" cylindrical die, dried overnight at 120° C. and calcined in air at 565° C. The properties of the catalyst are listed in Table I.

COMPARATIVE EXPERIMENT A

A catalyst was prepared using a conventional dry pore volume impregnation technique. A solution suitable for impregnating a gamma alumina carrier was prepared as follows. A first solution was made by adding 13.04 grams of nickel nitrate and 17.41 grams of phosphoric acid to 5 milliliters of water. To this solution was added 3.43 grams of nickel carbonate. The solution was then heated to 40° C. and stirred in order to effect dissolution of the materials. A second solution was prepared by mixing 6.8 milliliters of 30% hydrogen peroxide, 25 milliliters of distilled water and 26.90 grams of ammonium heptamolybdate. The mixture was then heated to 40° C. and stirred until all solids were dissolved. To this solution was added 6.58 grams of molybdic oxide, followed by the addition of 2.80 grams of monoethanolamine. Heating and stirring were continued until a clear yellow solution was obtained. When both solutions were at or near ambient temperature, the second solution was slowly added to the first solution while stirring. After cooling and diluting with water to the total pore volume of the support, the solution was added to the gamma alumina support in several small portions with intermediate agitations. The impregnated support was further agitated about 5 minutes, dried for 2 hours at 400° F. and calcined in air for 2 hours at 900° F. The properties of the catalyst are listed in Table I.

COMPARATIVE EXPERIMENT B

A catalyst was prepared using a conventional dry pore volume impregnation technique. A solution suitable for impregnating a gamma alumina carrier was prepared as follows. A first solution was made by adding 15.37 grams of cobalt nitrate and 9.67 grams of phosphoric acid to 5 milliliters of water which solution was then heated to 40° C. and stirred in order to effect dissolution of the materials. A second solution was prepared by mixing 4.0 milliliters of 30% hydrogen peroxide, 40 milliliters of distilled water and 23.39 grams of ammonium heptamolybdate. The mixture was then heated to 40° C. and stirred until all solids were dissolved. When both solutions were at or near ambient temperature, the second solution was slowly added to the first solution while stirring. After cooling and diluting to the total water pore volume of the support, the solution was added to the gamma alumina support in several small portions with intermediate agitations. The impregnated support was further agitated about 5 minutes, dried for 2 hours at 400° F. and calcined in air for 2 hours at 900° F. The properties of the catalyst are listed in Table I.

CONVENTIONAL SULFIDING

Catalyst samples were subjected to a conventional sulfiding procedure which includes subjecting the catalyst to a 5% $H_2S/H_2$ gas mixture for two hours at 400° F., raising the temperature to 600° F. for one additional hour, and then raising the temperature to 700° F. for two hours. The catalysts were then tested using the hereinafter described procedure.

HIGH TEMPERATURE SULFIDING

Catalyst samples were subjected to a conventional sulfiding procedure followed by contacting the catalyst with the 5% $H_2S/H_2$ gas mixture at a temperature of 900° F. for two hours. The catalysts were then tested using the hereinafter described procedure.

CATALYST TESTING

Catalyst samples were used to hydrotreat a catalytically-cracked heavy gas oil (CCHGO) in a trickle-flow reactor. Ten ccs of the extruded catalyst were crushed and sieved to a 16–45 mesh, diluted with silicon carbide, and loaded into a typical trickle-flow reactor tube. The catalyst was presulfided with a 5% $H_2S/H_2$ (v/v) gas mixture at 700° F. for 2 hours prior to testing. A CCHGO was passed over the catalyst at 650° F. and 850 psig $H_2$ with a $H_2$/oil equal to 4.0. Rate constants are reported relative to the conventionally sulfided catalysts. Measured volumetric rate constants include desulfurization. Specific catalyst performance characteristics for conventionally sulfided catalysts and catalysts sulfided at high temperatures are presented in Table II. As can be seen from Table II, when subjected to a high temperature sulfiding treatment, the hydrogel-derived catalysts prepared according to the invention show enhanced desulfurization activities of at least about 10% relative to conventionally sulfided hydrogel-derived catalysts. Impregnated catalysts, however, when subjected to a high temperature sulfiding treatment do not result in enhanced desulfurization activities relative to conventionally sulfided impregnated catalysts.

TABLE I

| | Catalyst Properties | | | | |
|---|---|---|---|---|---|
| | Example 1 | Example 2 | Example 3 | Comparative Experiment A | Comparative Experiment B |
| Density[a] gm/cc | 0.68 | 0.67 | 0.75 | 0.82 | 0.77 |
| $N_2$ Surface Area[b] m²/gm | 417 | 366 | 382 | 160 | 193 |
| $N^2$ Pore Volume[c] cc/gm | 0.54 | 0.42 | 0.43 | — | — |
| % wt. Cobalt[d] | — | 2.8 | 1.8 | — | 2.4 |
| % wt. Nickel | 3.9 | — | — | 3.0 | — |
| % wt. Molybdenum[e] | 12.3 | 11.6 | 8.6 | 13.0 | 10.0 |
| % wt. Phosphorus[f] | 5.4 | 4.2 | 4.1 | 3.2 | 2.0 |
| Hg Pore Size Distribution[g] | | | | | |
| <50 Å | 77.8 | 31.8 | 85.1 | 6.4 | 1.9 |
| 50–70 Å | 4.1 | 60.2 | 4.1 | 16.4 | 11.8 |
| 70–100 Å | 5.0 | 2.6 | 3.2 | 29.9 | 36.8 |
| 100–150 Å | 12.1 | 2.0 | 2.7 | 38.1 | 38.1 |
| 150–350 Å | 1.0 | 2.0 | 3.1 | 6.6 | 9.3 |

TABLE I-continued

| Catalyst Properties | | | | | |
|---|---|---|---|---|---|
| | Example 1 | Example 2 | Example 3 | Comparative Experiment A | Comparative Experiment B |
| >350 Å | 0.0 | 1.4 | 1.8 | 2.7 | 2.1 |

[a] 209 cc volume fully settled in a graduated cup and weighed.
[b] BET, by nitrogen adsorption/desorption. Micromeritics Digisorb 2500 Instrument.
[c] By nitrogen adsorption. Micromeritics Digisorb 2500 Instrument.
[d] Weight percent determined by neutron activation analysis or atomic absorption analysis or atomic absorption spectroscopy.
[e] Weight percent determined by neutron activation analysis or atomic absorption spectroscopy.
[f] Weight percent determined by neutron activation analysis or atomic absorption spectroscopy.
[g] Determined by mercury intrusion, to 60,000 psi using a Micromeritics Antopore 9210, using a 130° contact angle and 0.473 N/m surface tension of mercury. Numbers listed are percent pore volume.

TABLE II

| SPECIFIC CATALYST PERFORMANCE | | |
|---|---|---|
| | Conventional Sulfiding S | High Temperature Sulfiding S |
| Example 1 | 1.00 | 1.20 |
| Example 2 | 1.00 | 1.11 |
| Example 3 | 1.00 | 1.11 |
| Comparative Experiment A | 1.00 | 0.91 |
| Comparative Experiment B | 1.00 | 1.04 |

What is claimed is:

1. A process for increasing the desulfurization activity of a hydrotreating catalyst used for hydrotreating sulfur-containing feedstocks at a temperature in the range of from about 400° F. to about 850° F. prepared by incorporating an element selected from the group consisting of nickel, cobalt and mixtures thereof, and a heavy metal selected from the group consisting of molybdenum, tungsten and mixtures thereof, into an alumina hydrogel, which comprises sulfiding said catalyst with a gaseous sulfur compound at a temperature of at least about 900° F. for at least about one hour.

2. The process of claim 1 wherein prior to sulfiding, said catalyst is calcined in air at a temperature in the range of from about 300° F. to about 900° F.

3. The process of claim 1 wherein said sulfiding treatment is carried out with a gas comprising hydrogen and $H_2S$ and a terminal temperature of at least about 900° F.

4. The process of claim 1 wherein said catalyst has a surface area of at least about 300 m$^2$/g and at least about 75% of its pore volume in pores having diameters less than about 70 Å.

5. The process of claim 1 wherein said alumina hydrogel contains a phosphorus-containing compound.

6. The process of claim 5 wherein said phosphorus-containing compound is selected from the group consisting of phosphoric acid, a phosphate salt and mixtures thereof.

7. The process of claim 1 wherein said catalyst is prepared by incorporating nickel, molybdenum and a phosphorus-containing compound into an alumina hydrogel.

8. The process of claim 7 wherein said alumina hydrogel contains a phosphorus-containing compound.

9. The process of claim 7 wherein said catalyst contains from about 1% w to about 5% w nickel and from about 8% w to about 18% w molybdenum.

10. The process of claim 7 or 8 wherein said phosphorus-containing compound is selected from the group consisting of phosphoric acid, a phosphate salt and mixtures thereof.

11. The process of claim 1 wherein said catalyst is prepared by incorporating cobalt, molybdenum and a phosphorus-containing compound into an alumina hydrogel.

12. The process of claim 11 wherein said alumina hydrogel contains a phosphorus-containing compound.

13. The process of claim 11 wherein said catalyst contains from about 1% w to about 5% w cobalt and from about 8% w to about 18% w molybdenum.

14. The process of claim 11 or 12 wherein said phosphorus-containing compound is selected from the group consisting of phosphoric acid, a phosphate salt and mixtures thereof.

15. The process of claim 1 wherein said catalyst is prepared by incorporating nickel, molybdenum and a phosphorus-containing compound into an alumina hydrogel, the sulfiding treatment is carried out with a gas comprising hydrogen and $H_2S$ and the terminal temperature of the sulfiding is at least about 900° F.

16. The process of claim 15 wherein said catalyst has a surface area of at least about 300 m$^2$/g and at least about 75% of its pore volume in pores having diameters less than about 70 Å.

17. The process of claim 1 wherein said catalyst is prepared by incorporating cobalt, molybdenum and a phosphorus-containing compound into an alumina hydrogel, the sulfiding treatment is carried with a gas comprising hydrogen and $H_2S$ and the terminal temperature of the sulfiding is at least above about 900° F.

18. The process of claim 17 wherein said catalyst has a surface area of at least about 300 m$^2$/g and at least about 75% of its pore volume in pores having diameters less than about 70 Å.

* * * * *